(12) United States Patent
Morgan et al.

(10) Patent No.: US 10,107,407 B2
(45) Date of Patent: Oct. 23, 2018

(54) MODULAR VALVE MANIFOLD SYSTEM

(75) Inventors: Daniel P. Morgan, Vacaville, CA (US); Clay Nesbitt, Benicia, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/222,781

(22) Filed: Aug. 31, 2011

(65) Prior Publication Data

US 2012/0073685 A1    Mar. 29, 2012

Related U.S. Application Data (60) Provisional application No. 61/387,237, filed on Sep. 28, 2010.

(51) Int. Cl.
*F16K 27/02* (2006.01)

(52) U.S. Cl.
CPC ... *F16K 27/0236* (2013.01); *Y10T 137/87893* (2015.04); *Y10T 137/87917* (2015.04)

(58) Field of Classification Search
CPC .............. F16K 27/0236; F16L 41/065; Y10T 137/87885; Y10T 137/87901; Y10T 137/87877; Y10T 137/6123; Y10T 137/87917; Y10T 137/87893
USPC .......................... 137/318, 883, 886, 884, 613
See application file for complete search history.

(56) References Cited

U.S. PATENT DOCUMENTS

| | | | |
|---|---|---|---|
| 660,526 A * | 10/1900 | Burritt | ........................... 137/318 |
| 714,508 A | 11/1902 | Moser | |
| 717,042 A * | 12/1902 | Smith | ....................... B05B 1/14 |
| | | | 239/280 |
| 973,042 A * | 10/1910 | Hicks | ..................... F02M 37/22 |
| | | | 137/549 |
| 1,172,298 A * | 2/1916 | Morris | .................... F16L 19/04 |
| | | | 251/145 |
| 1,470,485 A | 10/1923 | Rouen | |
| 3,038,490 A * | 6/1962 | Yocum | .................. F16L 41/065 |
| | | | 137/318 |
| 3,252,474 A | 5/1966 | Ehrens et al. | |
| 3,252,475 A * | 5/1966 | Jones | ............................ 137/318 |
| 3,292,954 A | 12/1966 | Corey | |
| 3,346,486 A | 10/1967 | Winter et al. | |
| 3,417,780 A * | 12/1968 | Lienard | ................. F16K 27/062 |
| | | | 137/887 |
| 3,428,075 A * | 2/1969 | Wagner | ......................... 137/318 |
| 3,516,638 A * | 6/1970 | Piggott | ......................... 137/883 |
| 3,586,350 A | 6/1971 | Ashton | |
| 4,530,522 A | 7/1985 | Walker et al. | |

(Continued)

*Primary Examiner* — Craig J Price
(74) *Attorney, Agent, or Firm* — Renner, Otto, Boisselle & Sklar, LLP (57) ABSTRACT

Modular valve manifold system including a distribution tube and at least one valve mounted on the tube. Each valve has a body with an external port disposed along one of a first and a second radial axis, and a throughbore disposed along the other one of the axes and configured to receive the tube coaxially therethrough. The body is formed of a first body portion and a second body portion. The first body portion has a first face with a first channel formed therein defining a first portion of the throughbore and configured to be mounted on a first side of the tube. The second body portion has a second face with a second channel formed therein defining a second portion of the throughbore and configured to be mounted on the second tube side.

12 Claims, 5 Drawing Sheets

(56) References Cited

U.S. PATENT DOCUMENTS

| | | | |
|---|---|---|---|
| 4,540,011 A * | 9/1985 | Croxford | F16L 41/065 137/15.14 |
| 4,730,636 A * | 3/1988 | Volgstadt et al. | 137/318 |
| 4,772,195 A * | 9/1988 | Touchet | 137/884 |
| 5,732,744 A * | 3/1998 | Barr | C23C 16/44 118/715 |
| 5,988,217 A * | 11/1999 | Ohmi | F16K 27/003 137/496 |
| 6,012,475 A * | 1/2000 | Taylor et al. | 137/318 |
| 6,454,312 B1 | 9/2002 | Desorcy et al. | |
| 6,546,961 B2 * | 4/2003 | Fukushima | F16K 27/003 137/884 |
| 6,609,733 B2 | 8/2003 | Gilmore | |
| 7,036,528 B2 * | 5/2006 | Eidsmore | F16K 27/003 137/884 |
| 7,152,629 B2 * | 12/2006 | Tokuda | F16K 27/003 137/884 |
| 7,322,616 B2 * | 1/2008 | Lang | F16L 9/006 137/343 |
| 7,490,628 B2 * | 2/2009 | Frost | F24C 3/126 126/39 N |
| 7,543,856 B2 * | 6/2009 | Lang | 137/883 |
| 7,784,497 B2 * | 8/2010 | Eriksson | 137/884 |
| 7,886,770 B2 * | 2/2011 | Eriksson | 137/884 |
| 8,307,854 B1 * | 11/2012 | Vu | F16K 27/003 137/884 |
| 2003/0037648 A1 * | 2/2003 | Robison | B23B 5/168 83/13 |
| 2007/0012310 A1 * | 1/2007 | Huang | F24C 3/12 126/39 N |
| 2008/0078277 A1 | 4/2008 | Nortier et al. | |
| 2008/0309072 A1 * | 12/2008 | Dole | F16L 41/06 285/197 |

* cited by examiner

MODULAR VALVE MANIFOLD SYSTEM

CROSS-REFERENCE TO RELATED APPLICATIONS

The present application claims the benefit of the filing date of U.S. Provisional Application Ser. No. 61/387,127, filed Sep. 28, 2010, the disclosure of which is expressly incorporated herein by reference.

BACKGROUND OF THE INVENTION

The present invention relates broadly to valve manifold systems such as for the distribution of gases or other fluids from individual tanks, cylinders, bottles, or other sources used for calibrating spectrometers, chromatographs, and other analytical equipment, or in semiconductor manufacturing or other industrial processes.

Conventional valve manifolds typically involve the use of a brass, aluminum, steel, stainless steel, or other metal distribution tube to each end of which is welded a valve. Each valve may be multi-ported for attachment to the distribution tube and to additional manifolds or to other fluid componentry such as regulators and shut-offs. Accessories such as pigtails, hoses, check valves, pressure gauges, and alarms also may be attached on one of more ports of each valve. Conventional welded manifold designs generally suffer the disadvantage that the position of each valve position along the distribution tube is fixed and permanent. Consequently, a valve cannot be removed and replaced without cutting and rewelding. Distribution and other valve arrangements are shown, for example, in U.S. Pat. Nos. 714,508; 1,470,485; 3,252,474; 3,292,954; 3,346,486; 3,586,350; 4,530,522; 6,454,312; and 6,609,733, and in Pub. No. US 2008/0078277.

It is believed that improvements in valve manifolds would be well-received by chemical manufacturers and processors, as well as operators of oil and gas refineries, laboratories, and others.

BROAD STATEMENT OF THE INVENTION

The present invention is directed to a modular valve manifold system such as for the mixing or other distribution of one or more gases or other sources of fluid pressure, each of which may be supplied from a separate tank, bottle, cylinder, or other fluid source. Such system may be used, for example, for the dilution of liquids and gases in the on-site production of industrial process mixtures, such as for chemical, petrochemical, or semiconductor processes, or of standard mixtures such as employed in obtaining calibration curves or otherwise in the calibration of analytical equipment such as spectrometers, chromatographs, and other instruments.

In an illustrative embodiment, the system may include a distribution tube having a first end and a second end and a tube wall, the tube wall having a first side and an opposite second side, and at least one opening through the first tube side. At least one valve is mounted on the distribution tube. Each valve may include a body having an external port disposed along one of a first and a second radial axis, and a throughbore disposed along the other one of the first and the second radial axis second and configured to receive the tube coaxially therethrough. The body may have a passageway extending between a first passageway end connected in fluid communication with the inlet port and a second passageway end opening as an internal port into the throughbore, with the valve being actuable to open and close the passageway.

The body itself may include a first body portion including the external port and the passageway, and a second body portion. The first body portion may have a first face with a first channel formed therein defining a first portion of the throughbore and configured to be mounted on the first tube side. The second body portion may have a second face with a second channel formed therein defining a second portion of the throughbore and configured to be mounted on the second tube side. With the first body portion being mounted on the first side of the tube intermediate the first and the second end thereof, and the second body portion being mounted opposite the first body portion on the second side of the tube, the internal port of the body is disposed to open into fluid communication with the tube opening, and the second body portion face is mated to the first body portion to define the throughbore with the tube being received therethrough.

The present invention, accordingly, comprises the design, fabrication, construction, combination of elements, and/or arrangement of parts and steps, which are exemplified in the detailed disclosure to follow. Advantages of the present invention include a valve manifold which is modular so as to provide enhanced flexibility in configuring a variety of high and low pressure arrangements that may be semi-permanent without the need for welding or brazing. Each valve, moreover, may be mounted to the distribution tube at an orientation of 90° or 270° relative to the longitudinal axis of the distribution tube for added flexibility. The modularity of the system also allows for a variety of manifold configurations such as, for example, manifolds having multiple inlets and/or outlets. Such modularity further allows for the accommodation of a wide range flows, pressures, compositions, concentrations, and mixing ranges. Additional advantages include a modular system which allows for the use of various valve types, such as diaphragm, ball, cylinder, needle, bellows, and/or poppet, and for the valves to be field replaceable without the need for cutting, welding, or brazing operations. Such valves readily may be provided as hand-actuable, such as using a knob or lever, or as being pneumatically, electronically, or otherwise actuable, and as amenable for use with lockout-tagout (LOTO) devices. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense. In certain views of the figures, the axial direction may be shown by an arrow labeled "A," and the radial direction may be shown by an arrow labeled "R."

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the modular valve manifold system herein involved is described in connection with its configuration for use in the high or low pressure mixing and/or distribution of gases such as in the on-site production of industrial process mixtures, such as for chemical, petrochemical, or semiconductor processes, or of standard mixtures such as employed in obtaining calibration curves or otherwise in the calibration of analytical equipment such as spectrometers, chromatographs, and other instruments. It will be appreciated, however, that aspects of the present invention may find utility in other fluidic applications. Such applications and configuration of the system for such applications should be considered to be expressly within the scope of the present invention.

Figure 1:
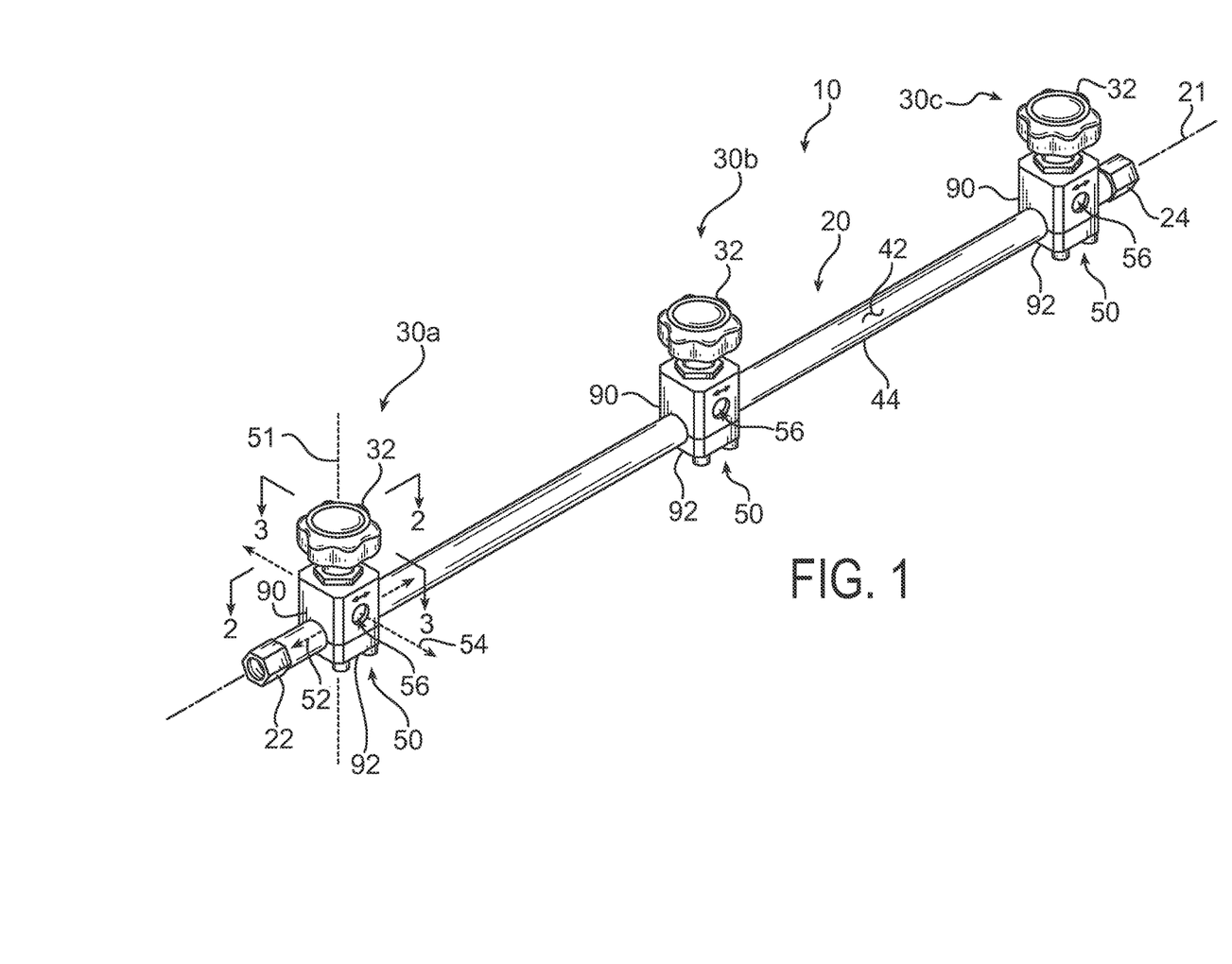
FIG. 1 is a perspective view of modular valve manifold system in accordance with the present invention including a distribution tube and one or more inlet valves.

Referring then to the figures wherein corresponding reference characters are used to designate corresponding elements throughout the several views with equivalent elements being referenced with prime or sequential alphanumeric designations, a representative modular valve manifold system configuration such as for mixing or otherwise distributing multiple streams of gases or other fluids is referenced generally at 10 in FIG. 1. In basic construction, system 10 includes a distribution tube, referenced generally at 20, which extends lengthwise along a longitudinal axis, 21, between a first end, 22, and a second end, 24. Each of the ends 22 and 24 may be threaded or otherwise adapted for an NPT, CGA, or other connection. Tube 20 generally may be formed of a metal or metal alloy, such as aluminum, steel, stainless steel, or brass, but alternatively may be formed of a plastic or composite.

One or more valves, reference generally at 30a-c, are mounted on tube 20 intermediate the ends 22 and 24 thereof as equally or otherwise spaced-apart along axis 22. In the illustrated configuration of system 10, each of the valves 30 is shown to be provided as an inlet valve which may be of a diaphragm variety and to be hand-actuable via a screw-type knob, 32. It should be appreciated, however, that other types of valves, such ball, cylinder, needle, bellows, and/or poppet, and other types of actuation, such as levers or pneumatic or electronic actuation, may be employed in one or more of the valves 30.

Figure 2:
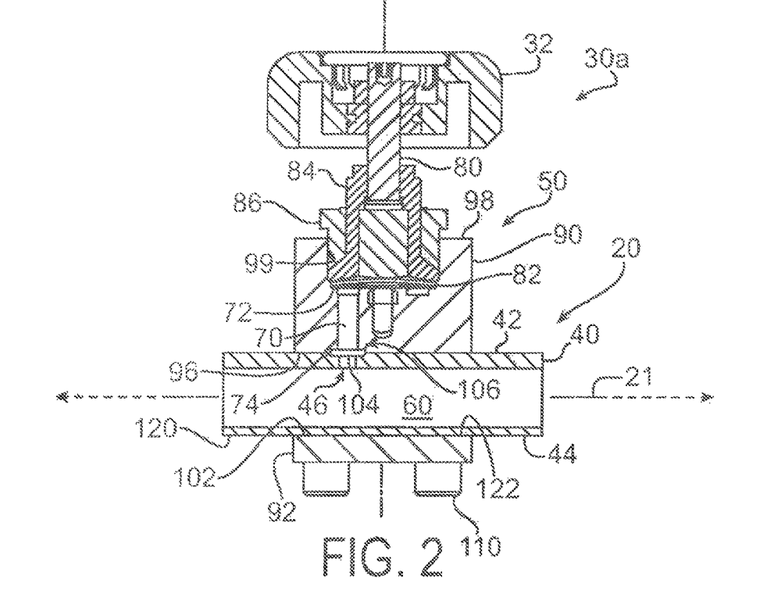
FIG. 2 is a cross-sectional view of the tube and one of the inlet valves of the system of FIG. 1 taken through line 2-2 of FIG. 1.
Figure 3:
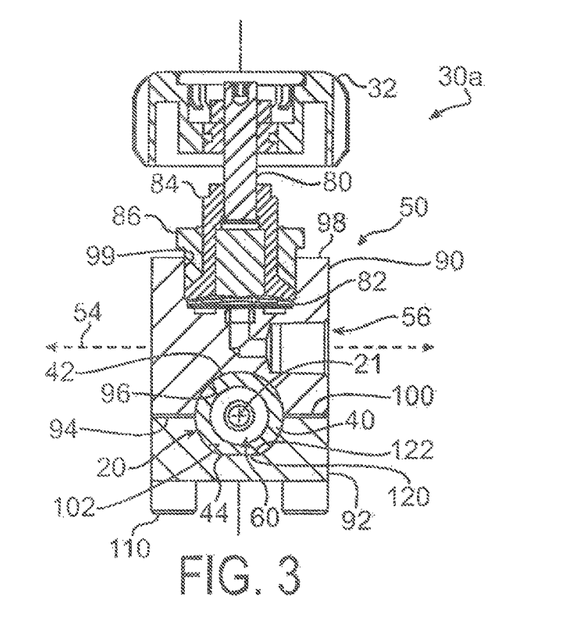
FIG. 3 is a cross-sectional view of the tube and valve of FIG. 2 taken through line 3-3 of FIG. 1.

Looking now to the cross-sectional views of tube 20 and valve 30a depicted in FIGS. 2 and 3, tube 20 may be seen to have a tube wall, 40, with an upper or other first side, 42, and a lower or otherwise opposite second side, 44. The tube first side 42 has at least one opening, referenced at 46 in FIG. 2, formed through wall 40. It should be appreciated that the number of such openings 46 will correspond to the number of valves 30 included in system 10 (FIG. 1), which each such valve being associated with a corresponding opening 46.

Valve 30a as mounted on tube 20 has a body, referenced generally at 50, which is orientated relative to a vertically-disposed central axis, 51, and a first, 52 (FIG. 2), and a second, 54 (FIG. 3), horizontally-disposed radial axis, with the first radial axis 52 intersecting the central axis 51 and the second radial axis 54 being transverse to the first radial axis 52 and the central axis 51. Body 50 has at least one external inlet port, referenced at 56 in FIG. 3, disposed in the direction of, i.e., coaxially with or otherwise parallel to, one of the radial axes, such as axis 54 as shown, and a throughbore, referenced at 60. Throughbore 60, which is configured to receive tube 20 coaxially therethrough, is disposed in the direction of the other one of the first and the second radial axes, such as axis 52 as shown, with the tube longitudinal axis 21 being aligned parallel with such axis 52. It should be appreciated that additional inlet, outlet, or other external ports (not shown) may be provided depending upon the requirements of application involved.

Body 50 further has a passageway, referenced at 70 in FIG. 2, which extends between a first passageway end, 72, connected in fluid communication with inlet port 56, and a second passageway end, 74, opening in the illustrated configuration of valve 30a as an outlet port into the throughbore 60. Valve 30a is actuable to open and close passageway 70. In this regard, in the diaphragm valve configuration shown for valve 30a, knob 32 is connected via an elongate stem, 80, to a diaphragm, 82, for the control thereof. Stem 80 may be secured to body 50 by way of a sleeve or bushing, 84, and an associated inverted nut, 86.

So as to be clampable or otherwise mountable onto tube 20, body 50 is formed of a first body portion, 90, and a second body portion, 92, matable with the first body portion 90. As configured as shown in FIGS. 2 and 3, first body portion 90 includes the external port 56 and passageway 70. First body portion 90, has a first face, 94 (FIG. 3), with a first channel, 96, formed therein. First channel 96 defines a first portion of throughbore 60, and is configured to be mounted on the first tube side 42. An opposite face, 98, may be threaded as at 99 to receive nut 86.

Second body portion 92, in turn, has a second face, 100 (FIG. 3), disposed as mounted on tube 20 opposite the first face 94 of first body portion 90. Second face 100 has a second channel, 102, formed therein which defines a second portion of throughbore 60 and is configured to be mounted on the second tube side 44.

As illustrated in FIGS. 2 and 3 for valve 30a, each of the valves 30 in system 10 (FIG. 1) may be clamped or otherwise affixed onto tube 20 by the mounting of first body portion 90 on the tube first side 42, with the second body portion 92 being mounted, in turn, opposite first body portion 90 on the tube second side 44. In this regard, the second body portion second face 100 is mated to the first face 94 of first body portion 90 to define throughbore 60 with tube 20 being received therethrough, and such that the valve body internal port defined by the passageway end 74 is disposed to open into fluid communication with the tube opening 46.

To provide a fluid-tight seal therebetween valve 30a and tube 20, an o-ring, gasket, or other generally annular seal member, referenced at 104 in FIG. 2, may be interposed between the passageway end 74 and the tube opening 46. Such seal 104 may be received in a counterbore or other gland, referenced generally at 106 in FIG. 2, formed in one or both of passageway end 74 and tube first surface 42. Depending upon the fluid or fluids being handled through system 10, seal 104 may be formed of variety of metal or non-metal materials. Such materials include elastomers, filled and unfilled fluoropolymers and other plastics, and metal and metal alloys such as nickel or stainless steel.

In order to allow for the easy removal from tube 20 of valve 30a, such as for the repair or replacement thereof, the first and second body portions 90 and 92 may be removably fastened together using a one or more bolts, screws, or other fasteners, one of which is referenced at 110. Thus, the second body portion 92 may be fastened to the first body portion 90 with tube 20 being thereby clamped between the first channel 96 of first body portion 90 and the second channel 102 of second body portion 92, which channels 96 and 102 together defining throughbore 60. For delimiting the rotation of valve 30a on tube 20, one and/or the other of the tube sides 42 and 44 may be formed as having a flat portion, 120, with a corresponding one of the body first channel 96 or second channel 102 being formed as having a flat portion, 122, which engages the tube flat portion 120.

Returning to FIG. 1, each of the valves 30a-c may be mounted onto tube 20 in the manner described for valve 30a in connection with FIGS. 2 and 3. Advantageously, the modularity of system 10 allows for each of the valves 30a-c to be mounted as shown with ports 56 being disposed at, for example, an orientation of 90° relative to the longitudinal axis 21 of tube 20. Alternatively, the orientation of one or more of the valves 30 may be rotated such that port 56 is disposed at an orientation of 270° degrees relative to axis 21.

Figure 4:
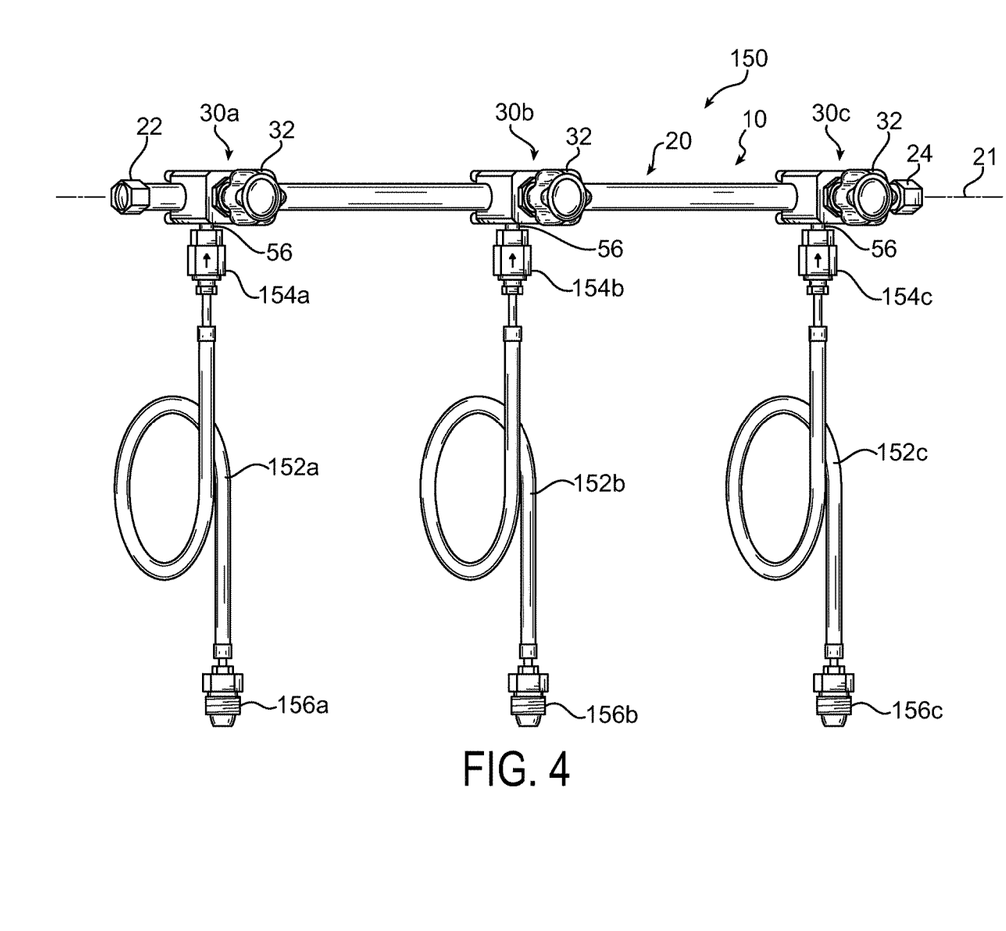
FIG. 4 is a perspective view of the valve manifold system of FIG. 1 as equipped for installation within a fluid circuit.

Turning next to FIG. 4, system 10 is shown as outfitted for use within a fluid circuit. In this regards, each of the ports 56 of valves 30a-c may be attached to an end of an associated hose, tube, pipe, or other line, 152a-c, such as via a check valve, 154a-c. The other end, 156a-c, of the lines 152 may be attached to a tank, bottle, cylinder, or other supply of a gas or other fluid. In such configuration, one or both of the tube ends 22 and 24 may be employed in the fluid circuit as an outlet for system 10, and in this regard may be connected, for example, to another manifold or to a regulator, shutoff valve, or other component.

Figure 5:
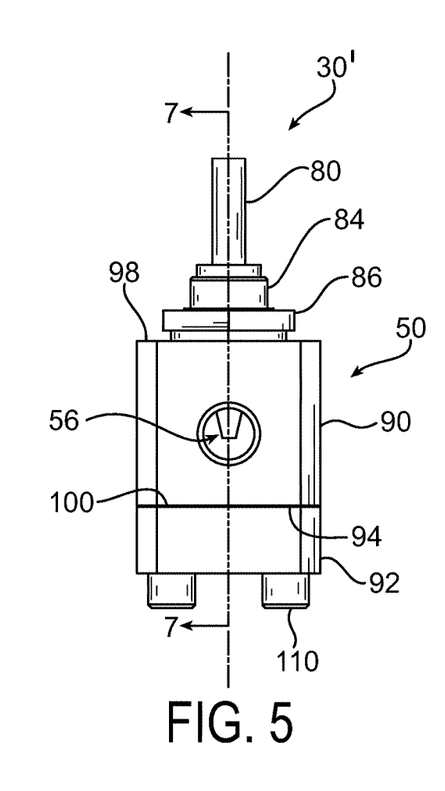
FIG. 5 is a front view of an outlet-type valve for use in the modular manifold valve system of the present invention.
Figure 6:
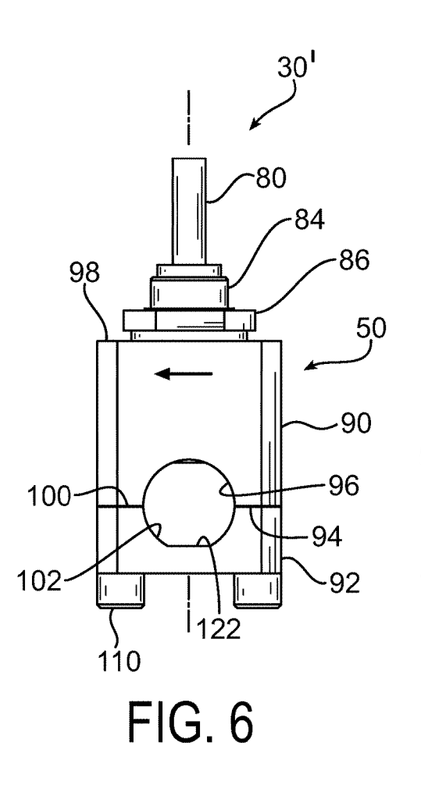
FIG. 6 is a side view of the valve of FIG. 5.
Figure 7:
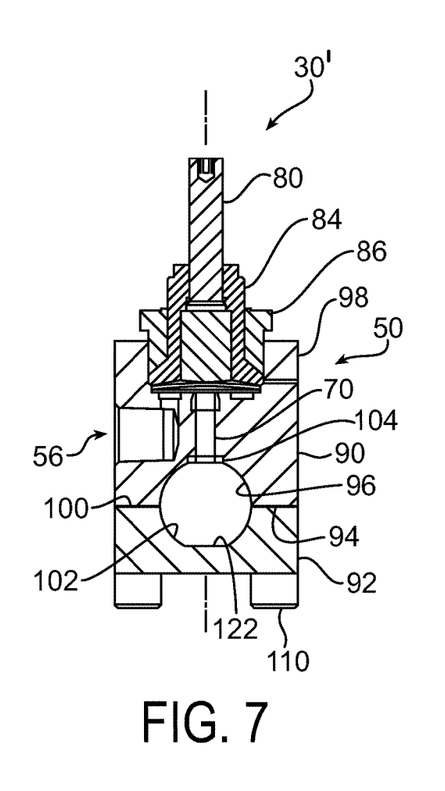
FIG. 7 is a cross-sectional view of the valve of FIG. 5 taken through line 7-7 of FIG. 5.
Figure 8:
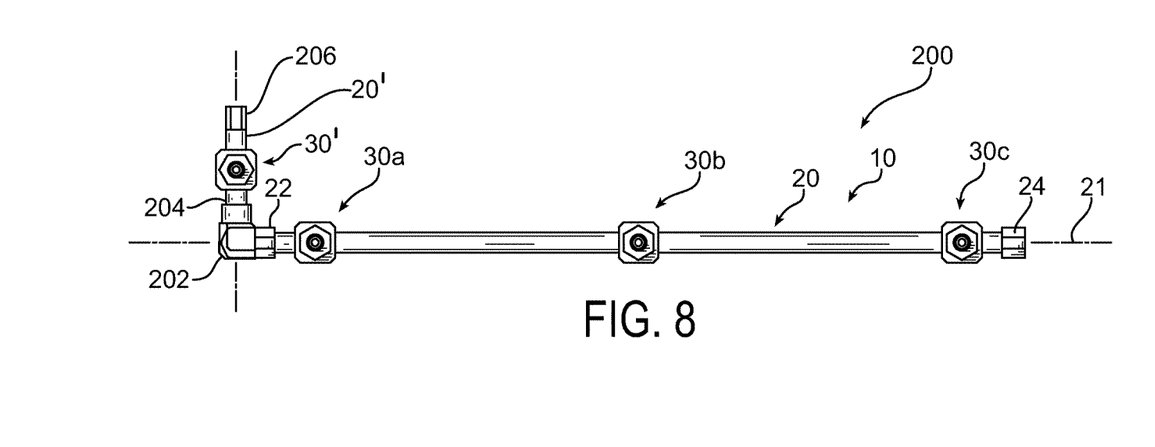
FIG. 8 is a top view of an alternative configuration of a modular manifold valve system of the present invention.
Figure 9:
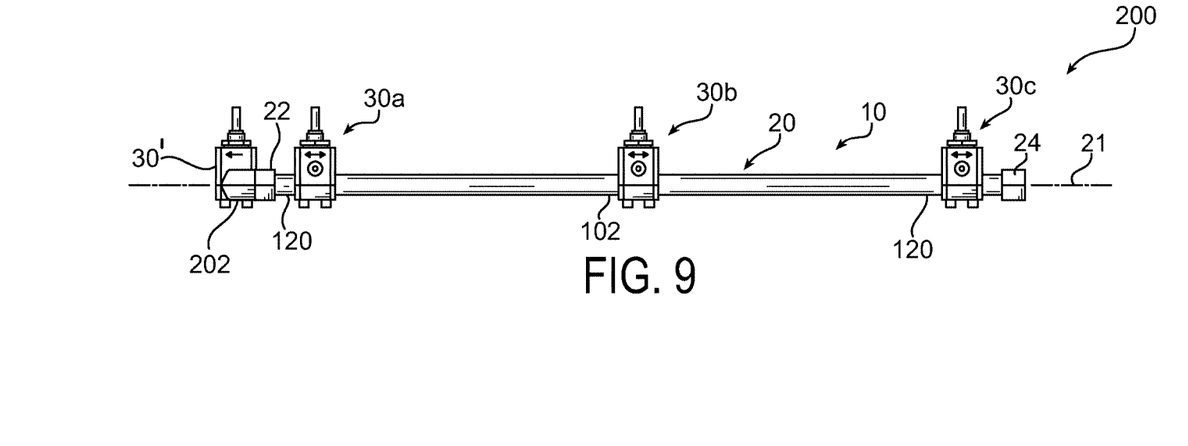
FIG. 9 is a front view of the system of FIG. 8.

With reference now to the several views of FIGS. 5-7, valve 30a reappears at 30' as configured now as an outlet valve, i.e., with port 56 function as an outlet of valve 30'. Such valve 30' may be used in the system shown at 200 in FIGS. 8 and 9 wherein end 22 of manifold 10 of FIG. 1 is coupled via an elbow or other fitting, 202, to an end, 204 (FIG. 8) of a stub or other tube, 20', to which valve 30' is mounted in the manner previously described. In such configuration 200, the other end, 206, of tube 20' may be connected within a fluid circuit to another manifold or to a fluid component.

Except as may be otherwise specified, materials of construction for the tube and valves of the modular valve manifold system of the present invention are to be considered conventional for the applications involved. Such materials generally will be corrosion resistant and otherwise selected for compatibility with the fluid being handled and/or for desired mechanical, thermal, or other physical properties.

Thus, a modular fluidic system incorporating the construction of present invention has been described.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A modular manifold system such as for a distribution of one or more gases or other sources of fluid pressure comprising:

a distribution tube extending lengthwise along a longitudinal tube axis having a first end and a second end and a tube wall, the tube wall having a first side and an opposite second side, and at least one opening through the first tube side; and at least one valve mounted on the distribution tube, each of said at least one valve comprising:

a body orientated relative to a vertical central axis, and a horizontal first radial axis intersecting the vertical central axis and the body having an external port having a longitudinal axis that is the horizontal first radial axis, and a throughbore having a central longitudinal throughbore axis extending through the throughbore, wherein the central longitudinal throughbore axis is transverse to the horizontal first radial axis, and wherein the throughbore is configured to receive the tube extending longitudinally along the central longitudinal throughbore axis, and the body having a passageway extending between a first passageway end connected in fluid communication with the external port and a second passageway end opening as an internal port into the throughbore, the valve being actuatable to open and close the passageway, wherein a central longitudinal passageway axis of the passageway extends through the passageway between the first passageway end and the second passageway end, and wherein the central longitudinal passageway axis intersects the central longitudinal throughbore axis and is offset parallel from the vertical central axis along the longitudinal throughbore axis, and the body comprising:

a first body portion including the external port and the passageway, and having a first face with a first channel formed in the first body portion defining a first portion of the throughbore and configured to be mounted on the tube first side; and a second body portion having a second face with a second channel formed in the second body portion defining a second portion of the throughbore and configured to be mounted on the tube second side, whereby with the first body portion being mounted on the tube first side intermediate the first and the second end of the tube and the second body portion being mounted opposite the first body portion on the tube second side, the internal port of the body is disposed to open into fluid communication with the tube opening, and the second body portion second face is mated to the first body portion first face to define the throughbore with the tube being received between the first and the second body portions in the throughbore.

2. The modular manifold system of claim 1 wherein the second body portion is fastened to the first body portion, the tube being thereby clamped between the first channel of the first body portion and the second channel of the second body portion.

3. The modular manifold system of claim 2 wherein:
one of the tube first and the tube second side is formed as having a tube flat portion; and a corresponding one of the body first and the second channel is formed as having a channel flat portion,
whereby with the tube being clamped between the first and the second channel, the channel flat portion is engaged with the tube flat portion to delimit rotation of the valve on the tube.

4. The modular manifold system of claim 3, wherein the tube flat portion is disposed axially opposite the opening through the first tube side along the vertical central axis of the body.

5. The modular manifold system of claim 1 wherein each of said valve further comprises a generally annular seal member interposed between the body internal port and the tube opening.

6. The modular manifold system of claim 1 comprising a first and a second said valve each mounted on the tube.

7. The modular manifold of claim 1, wherein the central throughbore axis intersects the vertical central axis.

8. The modular manifold of claim 1, wherein the vertical central axis extends external to the passageway.

9. The modular manifold system of claim 1, wherein the horizontal first radial axis is vertically offset along the vertical central axis from the central longitudinal throughbore axis.

10. The modular manifold system of claim 1, wherein the longitudinal tube axis is the central longitudinal axis of the tube, and wherein the central longitudinal tube axis is coaxial with the central longitudinal throughbore axis.

11. The modular manifold system of claim 1, wherein the central longitudinal throughbore axis is orthogonal to the vertical central axis.

12. The modular manifold system of claim 1, wherein the horizontal first radial axis is orthogonal to the vertical central axis and disposed along the vertical central axis between the first passageway end and the second passageway end.

* * * * *